(12) United States Patent
Kania

(10) Patent No.: US 11,511,947 B2
(45) Date of Patent: Nov. 29, 2022

(54) OVERHEAD SWEEP REJECTER FOR A CONVEYOR LINE

(71) Applicant: Mettler-Toledo, LLC, Columbus, OH (US)

(72) Inventor: Michal Kania, Rybnik (PL)

(73) Assignee: Mettler-Toledo, LLC, Columbus, OH (US)

( * ) Notice: Subject to any disclaimer, the term of this patent is extended or adjusted under 35 U.S.C. 154(b) by 0 days.

(21) Appl. No.: 17/233,609

(22) Filed: Apr. 19, 2021

(65) Prior Publication Data
US 2022/0332521 A1   Oct. 20, 2022

(51) Int. Cl.
*B65G 47/82* (2006.01)
*B65G 47/42* (2006.01)

(52) U.S. Cl.
CPC .......... *B65G 47/82* (2013.01); *B65G 47/42* (2013.01); *B65G 2203/0258* (2013.01)

(58) Field of Classification Search
None
See application file for complete search history.

(56) References Cited

U.S. PATENT DOCUMENTS

| | | | |
|---|---|---|---|
| 2,556,895 A | 6/1951 | Baker | |
| 2,842,253 A * | 7/1958 | Pasquale | B65G 47/82 198/430 |
| 3,108,797 A | 10/1963 | Mestre | |
| 4,440,289 A * | 4/1984 | Weis | B65G 47/681 198/448 |
| 4,595,091 A * | 6/1986 | Scopatz | B65G 47/82 198/598 |
| 5,464,088 A * | 11/1995 | Koerber | B65G 43/08 198/364 |

(Continued)

FOREIGN PATENT DOCUMENTS

| | | |
|---|---|---|
| CN | 205575021 U | 9/2016 |
| DE | 2153936 A1 | 5/1973 |

(Continued)

OTHER PUBLICATIONS

Digi, RJ-700 Variations, Rejector systems for the 700 series machines, Food Industry, Package Inspection & Sorting System, https://www.digisystem.com/products/PRD00147/variations/#Drop%20flap%20rejector, accessed online Aug. 28, 2018, 4 pages, Teraoka Seiko Co., Ltd.

(Continued)

*Primary Examiner* — William R Harp
(74) *Attorney, Agent, or Firm* — Standley Law Group LLP; Jeffrey S. Standley; Stephen L. Grant

(57) ABSTRACT

An overhead sweep rejecter (16) removes an object from a conveyor belt of a conveyor line. The rejecter has a kicker portion (22) that suspended for limited rotation about a pivot axis (40) from the housing. When a horizontal impulse is applied to the kicker portion by a rod (52), the limited rotation converts the impulse into a combination of vertical and horizontal impulses on the object, as would be provided by a pendulum. However, a contacting plate (34) on the kicker portion is pinned at a lower end (64) to a pair of guide rails (30) so that a vertical separation of the lower end remains at a constant vertical separation above the conveyor belt during rotation.

14 Claims, 6 Drawing Sheets

(56) References Cited

U.S. PATENT DOCUMENTS

| | | | |
|---|---|---|---|
| 6,220,421 B1 * | 4/2001 | Hugon | B65G 47/82 |
| | | | 198/468.1 |
| 10,364,104 B2 * | 7/2019 | Mäder | B65G 47/844 |
| 2009/0159400 A1 * | 6/2009 | Davidzon | B65G 47/82 |
| | | | 198/370.07 |

FOREIGN PATENT DOCUMENTS

| | | | | |
|---|---|---|---|---|
| EP | 2727858 | A1 | 10/2002 | |
| GB | 2262517 | A * | 6/1993 | B65G 59/067 |

OTHER PUBLICATIONS

Mettler-Toledo, Checkweighing Product Sorting, Pusher Sorting, https://www.mt.com/us/en/home/library/applications/product-inspection/checkweighi . . . , accessed online Aug. 29, 2018, 10 pages.

Mettler-Toledo GMBH, White Paper, How to Choose the Right Reject System, Jun. 2016, 14 pages.

Xavis Co., Ltd., X-ray Inspection System Rejector from XAVIS Co., Ltd. Manufacturers & suppliers, X-ray Inspection System Rejector, http://xavis.tradekorea.com/product/detail/P88498/X-ray-Inspection-System-Rejector.html?minisiteprodgroupno=9496, accessed online Aug. 28, 2018, 2 pages.

Anritsu Infivis Inc., Rejection Systems for Inspection Systems, Rejector Systems, https://www.anritsu.com/en-US/infivis/products/rejector, accessed online Aug. 28, 2018, 4 pages.

* cited by examiner

OVERHEAD SWEEP REJECTER FOR A CONVEYOR LINE

CROSS-REFERENCE TO RELATED APPLICATIONS

This application is a non-provisional application that makes no claim of priority.

TECHNICAL FIELD

An overhead sweep rejecter removes a product from a conveyor line after the product is determined to be outside of a specified range for a product parameter. The overhead sweep rejecter uses a sliding plate to reduce personal safety hazards in lifting the product slightly as the product is removed.

BACKGROUND ART

In many industries, but especially in foods and pharmaceuticals, product inspection with regard to at least one product parameter is a crucial step. Brand protection requires that off-spec product is identified and removed from the production line. There are many product parameters that can be measured as the product moves along a conveyor line. For purposes of illustration only, these include weight, presence of a contaminant, product color, defect in the container, and improper labelling. Once a product is identified as being off-spec, it needs to be removed as soon as possible from the conveyor.

The applicant has extensive experience in providing systems for removing off-spec product from a production line, particularly with regard to product that falls outside of a predetermined weight tolerance. This experience is summarized in a 2013 White Paper titled "How to Choose the Right Reject System." That paper lists types of reject devices and types of reject receptacles.

Overhead sweep rejecters of the prior art, such as those described in the White Paper, operate with a pendulum action that originates from a pivot point above the conveyor. Before use, the pendulum arm is drawn back into an "armed" position to swing across the direction of motion of the conveyor when released. As the bottom of the arm swings on an arcuate path centered about the pivot point, it moves downwardly towards the conveyor, past a low point when the arm is vertical, and then upwardly. Unlike a pusher rod that acts strictly horizontally, the arcuate motion of the pendulum can provide a vertical component to the force applied to a product being moved to a reject receptacle. The arcuate motion is also smooth and positive, which is desirable in moving larger delicate products. When reject receptacles are provided on each side of the conveyor, the overhead sweep rejecter as known can be arranged to move from an "armed" position on one side of the vertical to a corresponding "armed" position on the opposite side, so that products are removed alternatingly to opposite sides of the conveyor, using both reject receptacles.

When this type of overhead sweep rejecter is used, the vertical approach of the bottom of the pendulum arm toward the conveyor surface presents a potential for crushing or shearing an object in the path. This is a hazard for personnel which has not been solved in the known prior art.

It is an unmet objective, therefore, to minimize or eliminate this hazard while retaining the desirable aspects of the overhead sweep action as fully as possible.

SUMMARY

This and other objects are met by a device for removing an object from a conveyor belt of a conveyor line, comprising a housing and a kicker portion. The housing is adapted for attachment to the conveyor line and the kicker portion is suspended for rotation about a pivot axis from the housing, such that a vertical separation of a lower end of the kicker portion from the conveyor belt remains constant during rotation.

In some embodiments, the housing has a rear wall and a top wall; and the kicker portion comprises a wall that wraps around the sides and front of the top wall and extends downwardly, defining an interior of the kicker portion.

In some of these embodiments, the wall further comprises a portion that interacts with a slot in the rear wall to delimit angular rotation of the kicker portion in one direction away from the vertical.

In some embodiments, the device also comprises a contacting plate, arranged for sliding movement along a front side of the wall of the kicker portion.

In some of these embodiments, the device also comprises a vertical slot in the wall of the kicker portion and a plate connected though the vertical slot to the contacting plate, delimiting the sliding movement of the contacting plate.

In some of these embodiments, the device also comprises a guide rail housing, affixed to the housing and a pair of guide rails, restrained by the guide rail housing to horizontal movement, an end of each of the guide rails pivotally fixed to the contacting plate.

In some embodiments, the device further comprises a hydraulic cylinder, extending through a rear wall of the housing, a rod with a first end contained in the hydraulic cylinder and a second end directed toward an interior wall of the kicker portion, and a pair of plates, affixed to the interior wall of the kicker portion on each side of the second end of the rod and coupled thereto.

In some of these embodiments, each of the pair of plates has an elongate slot formed therein; and a short rod, coupled to the second end of the rod and extending transverse to an axis of the rod, each end of the short rod engaged in a respective one of the elongate slots, delimiting horizontal movement of the rod.

Some embodiments of the device comprise a first and a second side plate, removably secured to a rear wall of the housing, covering lateral faces of the kicker portion.

Other objects are met by a method for removing an object from a conveyor belt of a conveyor line, comprising:

positioning a device according to claim 1 for removing a rejected object and a receptacle for receiving the rejected object along the conveyor line opposite to each other, downstream of at least one parameter inspection unit;

identifying, in an evaluation unit, an object to be removed from the conveyor belt as the object moves past each said parameter inspection unit;

as the object to be removed moves past the device for removing, sending an output signal from an evaluation unit of the parameter inspection unit to provide an actuation impulse to the device for removing; and generating, from the actuation impulse, a horizontal force in the device for removing, rotating a kicker portion of the device from an unactuated vertical condition to an actuated condition in which a force having both horizontal and vertical components is imposed on the object to be removed, impelling the object to be removed into the reject receptacle;

wherein a vertical separation of a lower end of the kicker portion from the conveyor belt remains constant throughout the actuated condition.

In some of the method, a contacting plate on a wall of the kicker portion moves along the wall while the device is in the actuated condition to maintain the vertical separation.

BRIEF DESCRIPTION OF THE DRAWINGS

A better understanding of the inventive concept will be had when reference is made to the accompanying drawings, wherein identical parts are identified by identical reference numbers and wherein.

DETAILED DESCRIPTION OF THE EMBODIMENTS

Figure 1:
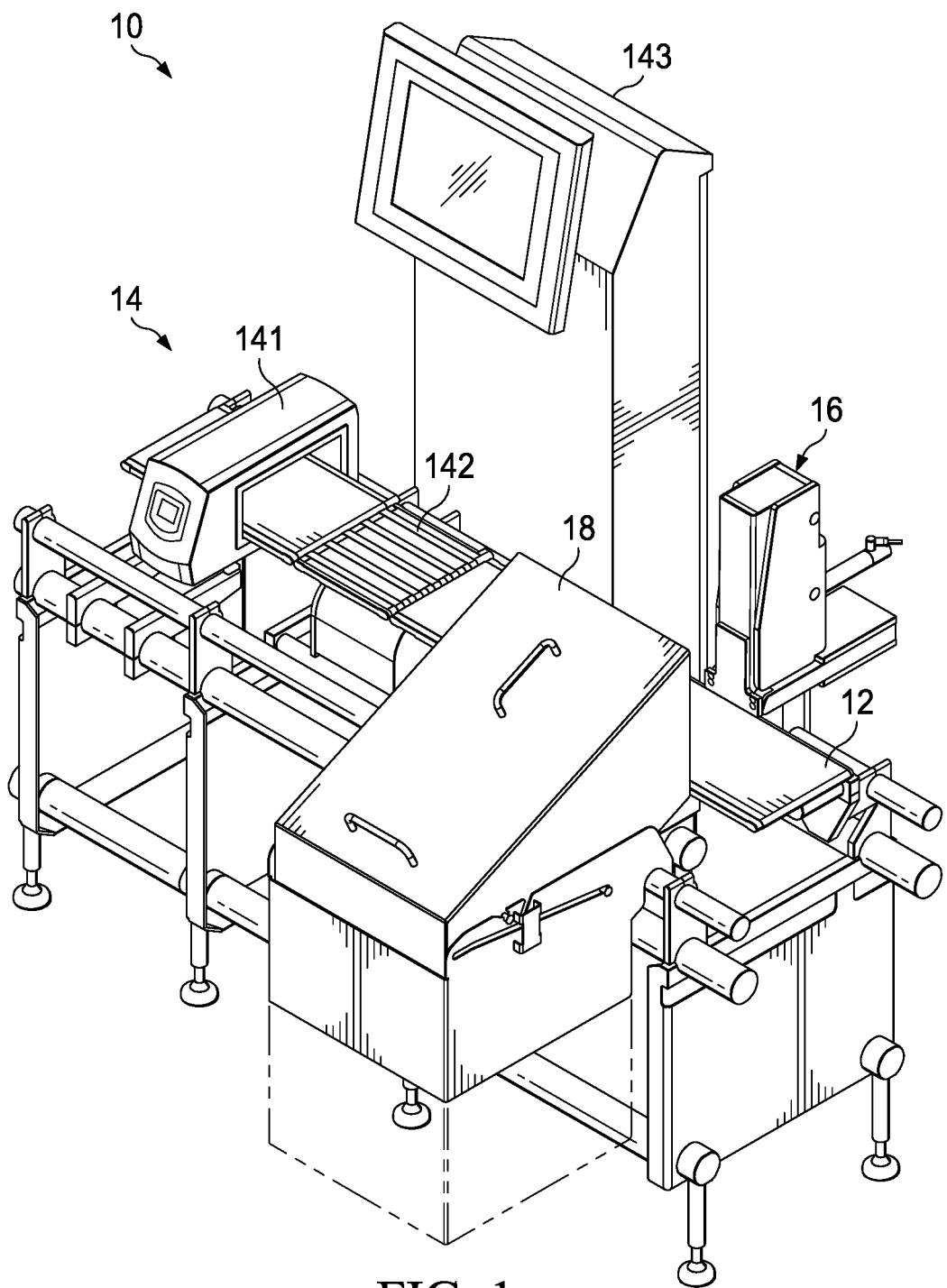
FIG. 1 is a front perspective view of a product inspection line with an overhead sweep rejecter incorporating the inventive concept.

FIG. 1 shows a perspective view of a portion of a product inspection line 10 having a conveyor belt 12, a parameter inspection unit 14, an overhead sweep rejecter 16 and a reject receptacle 18. Objects to be inspected are placed on the conveyor belt 12 and pass, along a direction of travel of the conveyor belt, through the parameter inspection unit 14. In the depicted embodiment, the parameter inspection unit 14 comprises a device 141 for detecting metal contaminants in the object and a checkweigher 142 for determining whether the object falls within an acceptable variance from a predetermined target weight. Other exemplary parameters that may evaluated include color of the product, contamination by radiation, defect in the packaging, and the like. Data from devices 141, 142 are provided to an evaluation unit 143 for comparison against predetermined product quality targets.

When an object under inspection fails to meet a predetermined target range of the parameter being inspected in the parameter inspection unit 14, an output signal is generated by the evaluation unit 143 cause actuation of the overhead sweep rejecter 16. As the object passes on the conveyor belt 12 that is between the overhead sweep rejecter 16 and the reject receptacle 18, an actuating impulse causes the overhead sweep rejecter to remove the off-spec object from the conveyor belt 12 into the reject receptacle 18. As seen in FIG. 1, the overhead sweep rejecter 16 is affixed to the conveyor along a siderail thereof.

Figure 2:
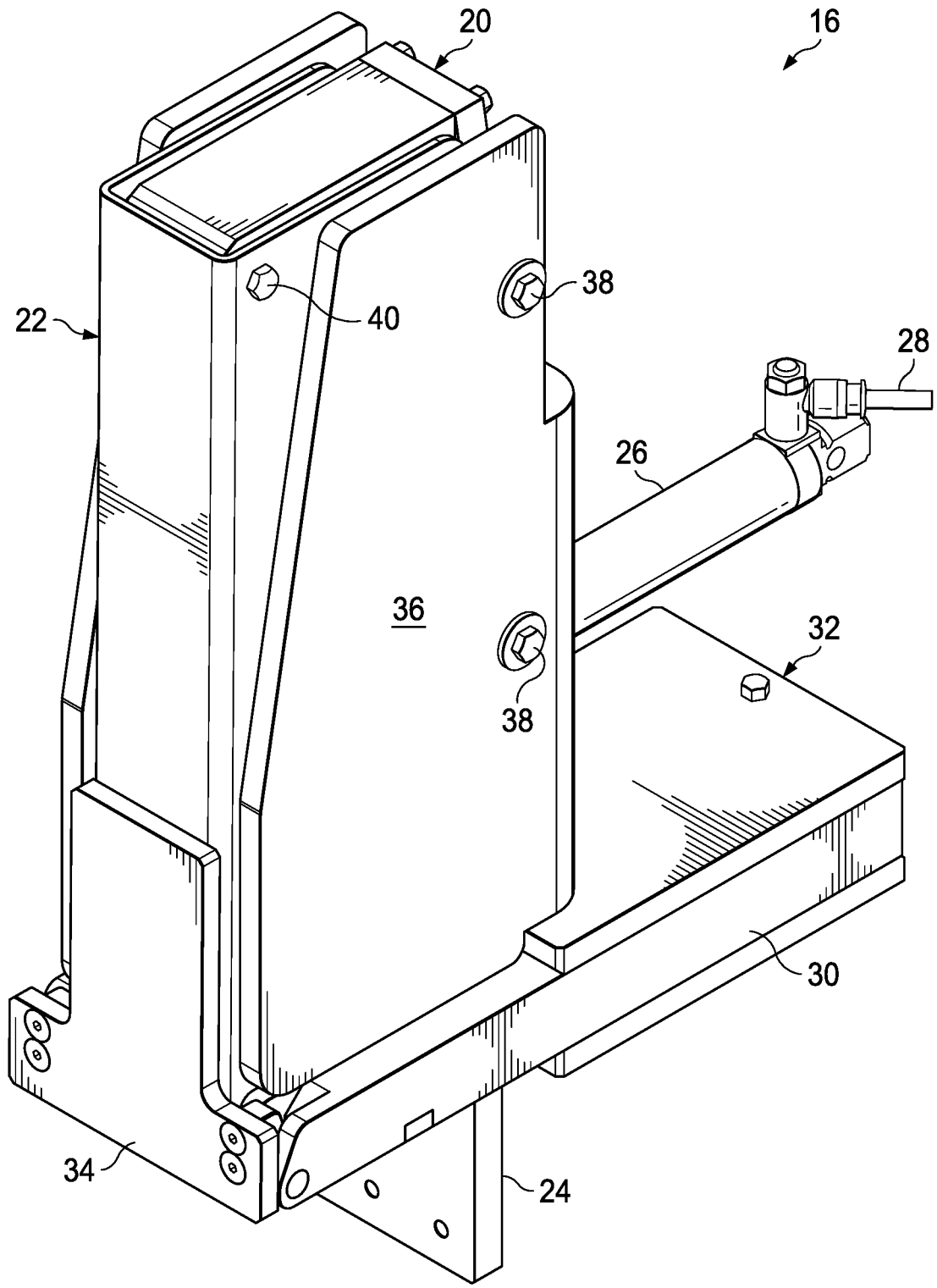
FIG. 2 is a front perspective view of the assembled overhead sweep rejecter, isolated from the product inspection line.
Figure 3:
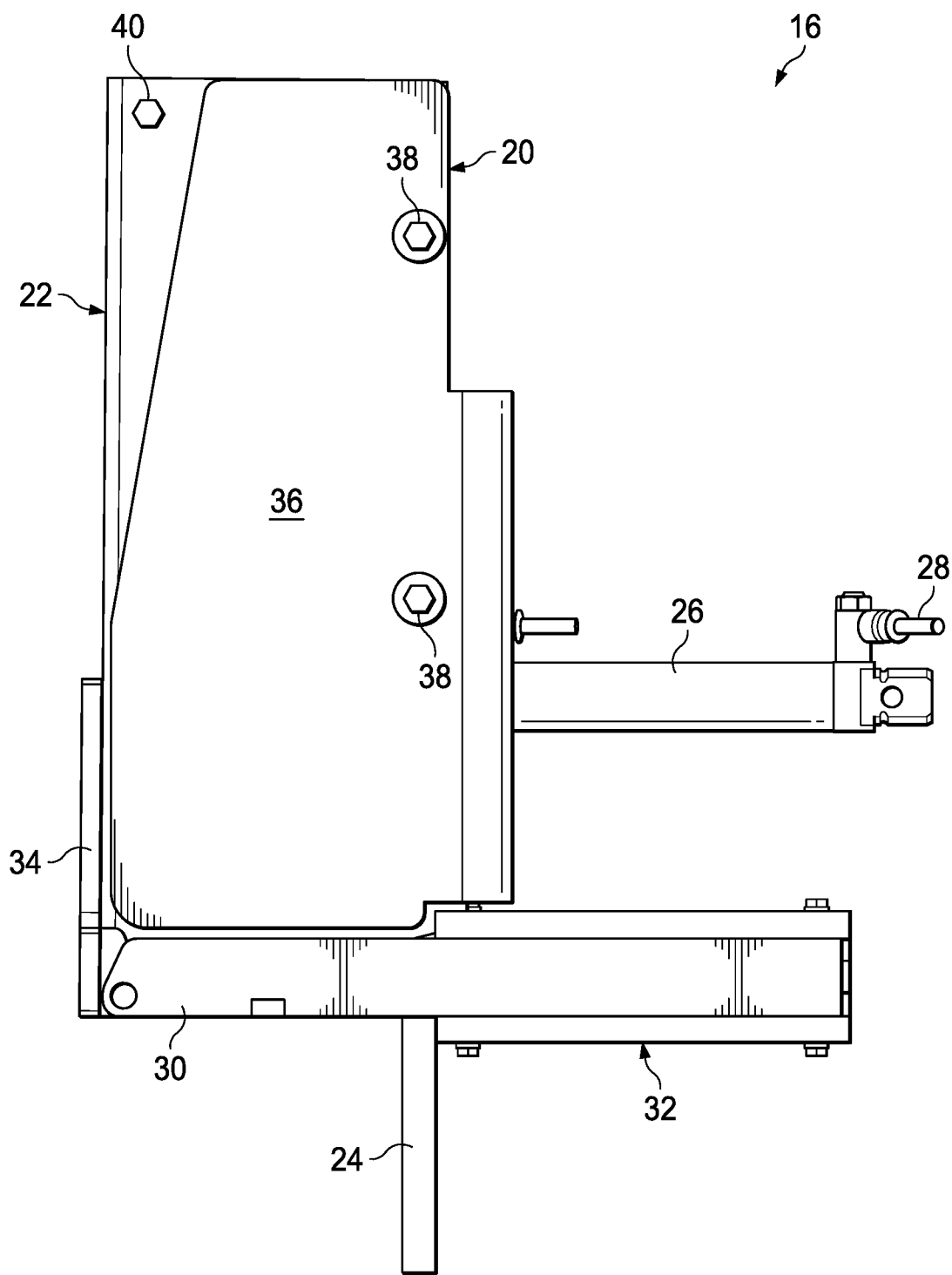
FIG. 3 is side elevation view of the assembled overhead sweep rejecter of FIG. 2.

FIG. 2 provides a front perspective view of an exemplary embodiment of an assembled overhead sweep rejecter 16 and FIG. 3 provides the side elevation view of it. Viewed generally in this assembled condition, the rejecter 16 has several parts. These include a housing 20, a kicker portion 22 that is pivotably suspended from the housing and a support 24 that is adapted to affix the housing adjacent to the conveyor with the kicker portion being positioned at a fixed predetermined gap above the conveyor belt. In FIG. 2, the kicker portion 22 is in a non-actuated position in which it is generally retracted into the housing 20. Other features seen in FIG. 2 are a hydraulic cylinder 26 containing a rod that receives the output signal from the evaluation unit, and a pair of guide rails 30, contained within a guide rail housing 32. A contacting plate 34 of the kicker portion 22 is positioned to be the primary element that contacts an object being moved off of the conveyor belt into the reject receptacle. As a safety feature, a pair of side plates 36 constitute a portion of the housing 20 that substantially covers moving parts of the overhead sweep rejecter 16 other than the contacting plate 34. Since a feature of the inventive concept is to provide a device that minimizes or eliminates the potential of injury, the side plates 36 of the depicted embodiment are shown removably fastened as by screws 38, or a similar fastener, to a portion of the housing from which the kicker portion 22 is suspended, as by a pin 40 or similar pivotable mounting means.

Figure 4:
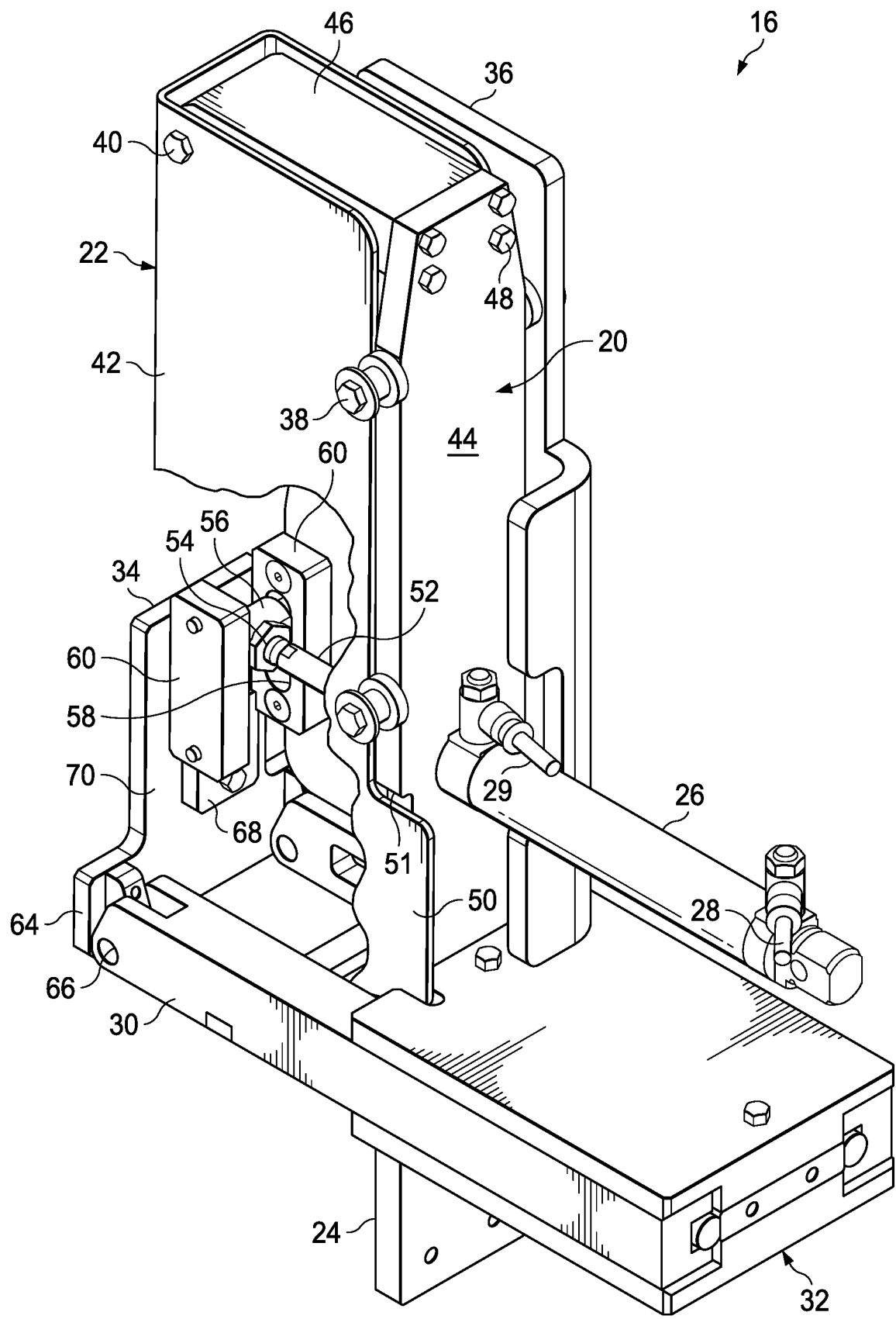
FIG. 4 is a rear perspective view of the overhead sweep rejecter, with a portion of a kicker portion removed to show internal structures.

FIG. 4 reveals internal features of the overhead sweep rejecter 16 and the kicker portion 22 in a rear perspective view in which one of the side plates 36 and part of a wall 42 of the kicker portion 22 removed to show internal structures. The side plate 36 on the far side of the housing 20 is in place, but only the screws 38 that would attach the side plate on the near side are shown. These screws 38 connect the side plate 36 to a rear wall 44 of the housing 20. The rear wall 44 is shown as being a separate element from a top horizontal wall 46, the respective walls being removably joined together by screws 48, bolts or the like, but some embodiments may have these walls formed monolithically and other embodiments may have them integrally joined, as by welding or the like. It is the top horizontal wall 46 that provides the pivotal suspension of the kicker portion 22, using pin 40. Wall 42 of the kicker portion 22 is shown in FIG. 4 with a portion removed to show other features. This wall 42 wraps around the sides and front of top horizontal wall 46. It is wall 42 that is pivotably pinned to the top horizontal wall 46, and, notably, the pivotal connection at 40 is the only connection between the kicker portion 22 and the housing 20. In the depicted embodiment, a portion 50 of the wall 42 is shaped and positioned to delimit rotation of the kicker portion 22 toward the rear wall by interacting with a slot 51 in the rear wall.

Figure 5A:
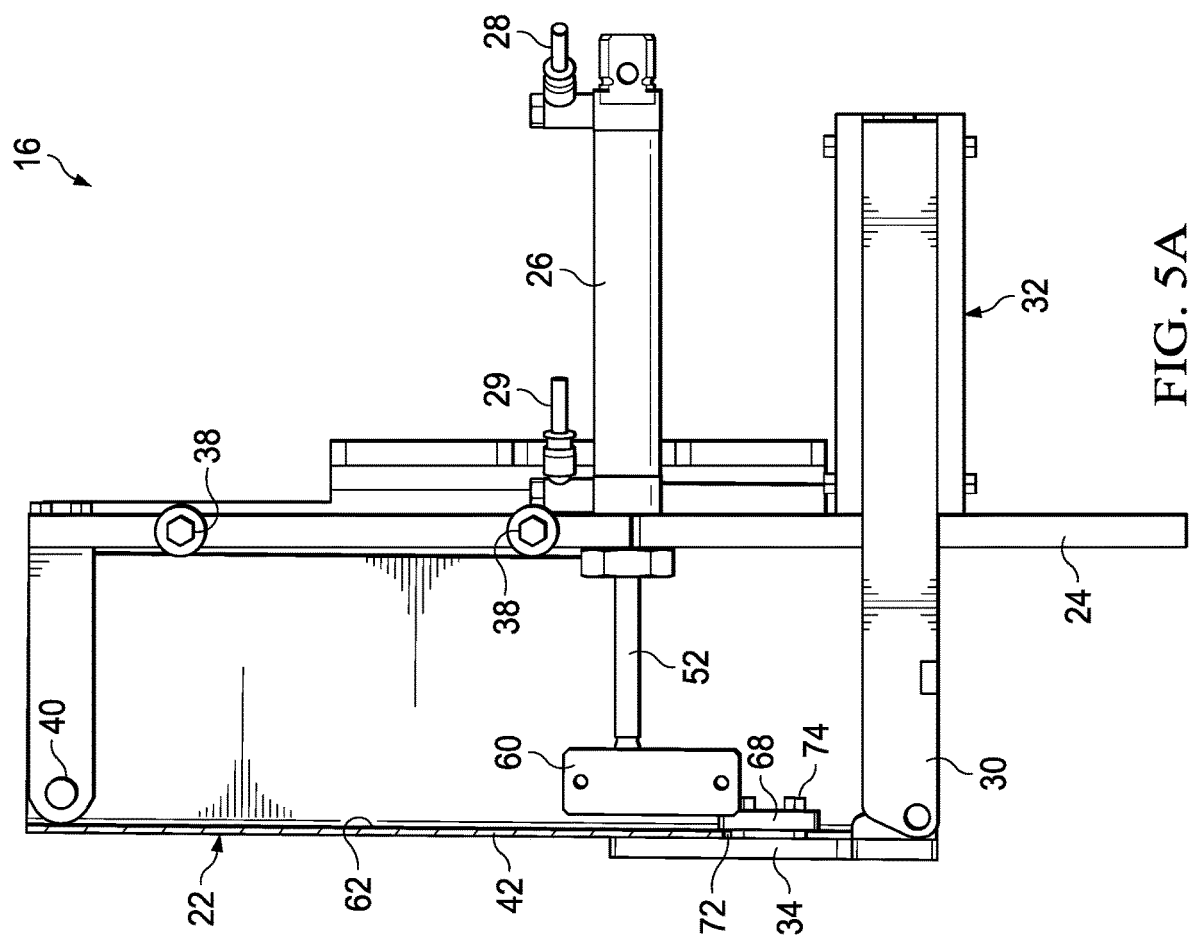
FIG. 5A is a side elevation view of the overhead sweep rejecter of FIG. 4, with the rejecter being in a first position in which it is not actuated.
Figure 5B:
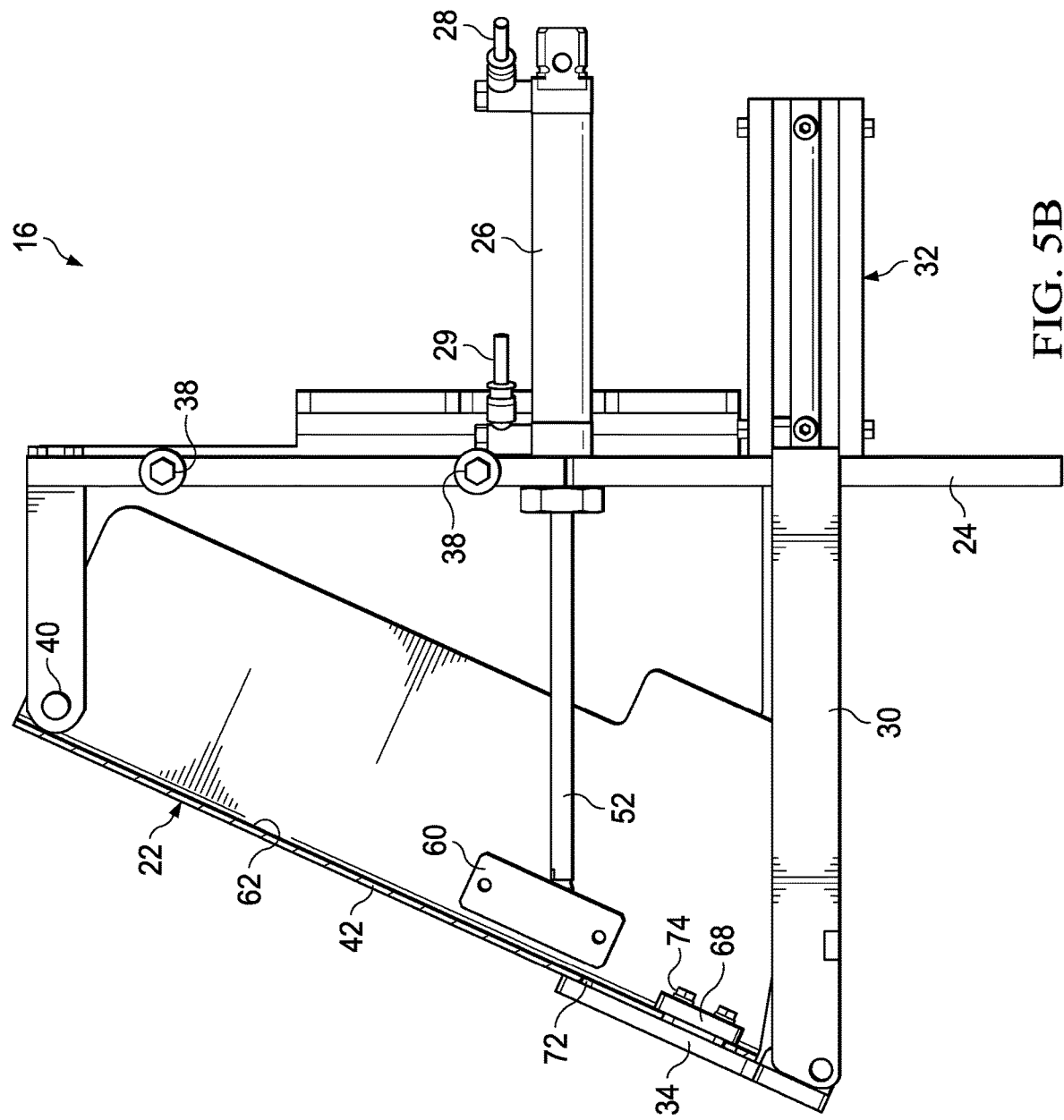
FIG. 5B is a side elevation view of the overhead sweep rejecter of FIG. 4, with the rejecter being in a second position in which it is actuated.

Viewed externally, contacting plate 34 appears to be affixed to wall 42, as seen in FIGS. 2 and 3, but as will be seen in FIGS. 4, 5A and 5B, the contacting plate is arranged for sliding movement on wall 42. The removal of a part of wall 42 in FIG. 4 permits internal structures to be seen and understood. Rod 52 has a first end in the hydraulic cylinder 26, which extends through the rear wall 44, the hydraulic cylinder being secured to the rear wall on an interior side of the rear wall. Preferably, all moving parts of the hydraulic system, and especially the rod 52, are contained within the housing 20, minimizing any hazard presented. FIG. 4 also shows fittings 28 and 29 for connection to a source of hydraulic fluid. A second end 54 of rod 52 is coupled to a short rod 56 that is transverse to an axis of rod 52. Each end of short rod 56 is engaged in one of a pair of elongate slots 58 formed in a pair of plates 60 that are on each side of second end 54, where each plate is affixed to a rear surface 62 of the wall 42 of kicker portion 22. This engagement of the ends of short rod 56 in the elongate slots 58 delimit the horizontal movement of rod 52, as will be further seen in FIGS. 5A and 5B.

FIG. 4 also shows that a lower end 64 of contacting plate 34 is pivotably fixed at each side to the pair of guide rails 30, with a pivotal fixing means, such as a pin 66. FIG. 4 also shows that these guide rails 30 are restrained to horizontal movement by the guide rail housing 32.

A final feature of note in FIG. 4 is plate 68, which appears to be directly affixed to a rear surface 70 of contacting plate 34, but which in fact enables delimited sliding movement of contacting plate 34 along wall 42, as will be seen in FIGS. 5A and 5B.

FIGS. 5A and 5B illustrate, in side sectional elevation view, how the overhead sweep rejecter 16 operates. In FIG. 5A, the rejecter 16 is in a non-actuated condition; in FIG. 5B, the rejecter is in the actuated condition. The mechanism disclosed in these figures retains the advantages of a pendulum motion for moving an object, while eliminating the crushing or shearing hazard posed by the lower end of a fixed length pendulum.

In the retracted position of FIG. 5A, the kicker portion 22 of the overhead sweep rejecter 16 hangs downward from the pivotal attachment to the housing. In this position, the lower surfaces of the guide rails 30 are suspended above the conveyor belt by a predetermined minimum distance, which is preferred to be about 6 mm. In this position, a lower edge of the contacting plate 34 is also suspended at the predetermined minimum distance.

Upon an actuation signal, an actuator sends hydraulic fluid to the hydraulic cylinder 26 to act on the rejecter 16, moving it from the FIG. 5A position to the fully-actuated FIG. 5B position, using an impetus imposed upon the kicker portion 22. In the depicted embodiment, the hydraulic cylinder 26 is arranged as a pusher that imposes a horizontal impetus through rod 52. It could also be arranged to impose a horizontal impetus on the pair of guide rails 30, or, although not as preferably, it could be arranged to apply rotational torque at pin 40.

In any of the particular cases, and as viewed in FIGS. 5A and 5B, the impetus applied though rod 52 causes clockwise rotation of kicker portion 22 about a pivot axis defined by pin 40. Particularly when this occurs through rod 52, plates 60 bear against the rear surface 62 of wall 42, effectively increasing the distance, as measured along the rear surface between the plates and the pin. As the rotation occurs, the horizontal force applied to an object by the contacting plate 34 resolves into a resultant vector having both horizontal and vertical components. The vertical component will tend to lift the object rather than merely to slide it, reducing the contact area between the object and the conveyor belt. This provides the advantageous effect of a pendulum rejecter.

However, the rotation of a conventional pendulum with a fixed length causes vertical separation between the bottom of the pendulum and a horizontal surface below it, giving rise to the shearing or crushing hazard. In the rejecter 16 of the inventive concept, this is avoided by providing a pendulum-type effect where the length of the pendulum arm effectively changes during rotation, so that vertical separation above the surface remains constant.

This result is achieved by the interaction of the combination of contacting plate 34 and plate 68 with wall 42, and especially a vertical slot 72 in wall 42. This vertical slot 72 is not really visible in FIG. 4, but can be seen in FIGS. 5A and 5B. Pins 74 connect contacting plate 34 to plate 68 through slot 72 in wall 42. Looking at FIGS. 5A and 5B, it is readily seen, particularly by comparing the location of plate 68 relative to pin 66 and plate 60. As the rejecter 16 rotates to the actuated condition of FIG. 5B, plate 68 maintains a constant distance from pin 66, but moves away from plate 60, with both measurements being taken along the line from pin 40 to pin 66. This movement lengthens the pendulum arm defined along that line. No crushing or shearing hazard is provided. In doing this, the length of vertical slot 72 can operate as a delimiter to the angular rotation of the kicker portion.

What is claimed is:

1. A device for removing an object from a conveyor belt of a conveyor line, comprising:
    a housing, adapted for attachment to the conveyor line; and
    a kicker portion, suspended for rotation about a pivot axis from the housing, comprising a wall with a contacting plate that is arranged for sliding movement along a front side of the wall, such that a vertical separation of a lower end of the contacting plate from the conveyor belt remains constant during rotation.

2. The device of claim 1, wherein:
    the housing has a rear wall and a top wall; and
    the wall of the kicker portion wraps around the sides and front of the top wall and extends downwardly, defining an interior of the kicker portion.

3. The device of claim 2, wherein the wall of the kicker portion further comprises a portion that interacts with a slot in the rear wall to delimit angular rotation of the kicker portion in one direction away from the vertical.

4. The device of claim 3, further comprising:
    a vertical slot in the wall of the kicker portion; and
    a plate connected though the vertical slot to the contacting plate, delimiting the sliding movement of the contacting plate.

5. The device of claim 4, further comprising:
    a guide rail housing, affixed to the housing; and
    a pair of guide rails, restrained by the guide rail housing to horizontal movement, an end of each of the guide rails pivotally fixed to the contacting plate.

6. The device of claim 3, further comprising:
    a guide rail housing, affixed to the housing; and
    a pair of guide rails, restrained by the guide rail housing to horizontal movement, an end of each of the guide rails pivotally fixed to the contacting plate.

7. The device of claim 1, further comprising:
    a vertical slot in the wall of the kicker portion; and
    a plate connected though the vertical slot to the contacting plate, delimiting the sliding movement of the contacting plate.

8. The device of claim 7, further comprising:
    a guide rail housing, affixed to the housing; and
    a pair of guide rails, restrained by the guide rail housing to horizontal movement, an end of each of the guide rails pivotally fixed to the contacting plate.

9. The device of claim 1, further comprising:
    a guide rail housing, affixed to the housing; and
    a pair of guide rails, restrained by the guide rail housing to horizontal movement, an end of each of the guide rails pivotally fixed to the contacting plate.

10. The device of claim 1, further comprising:
    a hydraulic cylinder, extending through a rear wall of the housing;
    a rod, having a first end contained in the hydraulic cylinder and a second end directed toward an interior wall of the kicker portion; and
    a pair of plates, affixed to the interior wall of the kicker portion on each side of the second end of the rod and coupled thereto.

11. The device of claim 10, wherein:
   each of the pair of plates has an elongate slot formed therein; and
   a short rod, coupled to the second end of the rod and extending transverse to an axis of the rod, each end of the short rod engaged in a respective one of the elongate slots, delimiting horizontal movement of the rod.

12. The device of claim 1, further comprising:
   a first and a second side plate, removably secured to a rear wall of the housing, covering lateral faces of the kicker portion.

13. A method for removing an object from a conveyor belt of a conveyor line, comprising:
   positioning a device according to claim 1 for removing a rejected object and a receptacle for receiving the rejected object along the conveyor line opposite to each other, downstream of at least one parameter inspection unit;
   identifying, in the parameter inspection unit, an object to be removed from the conveyor belt as the object moves past each said parameter inspection unit;
   as the object to be removed moves past the device for removing, sending an output signal from the parameter inspection unit to provide an actuation impulse to the device for removing; and
   generating, from the actuation impulse, a horizontal force in the device for removing, rotating a kicker portion of the device from an unactuated vertical condition to an actuated condition in which a force having both horizontal and vertical components is imposed on the object to be removed, impelling the object to be removed into the reject receptacle;
   wherein a vertical separation of a lower end of the kicker portion from the conveyor belt remains constant throughout the actuated condition.

14. The method of claim 13, wherein a contacting plate on a wall of the kicker portion moves along the wall while the device is in the actuated condition to maintain the vertical separation.

* * * * *